United States Patent [19]
Sorrells

[11] Patent Number: 6,043,746
[45] Date of Patent: Mar. 28, 2000

[54] RADIO FREQUENCY IDENTIFICATION (RFID) SECURITY TAG FOR MERCHANDISE AND METHOD THEREFOR

[75] Inventor: Peter Sorrells, Chandler, Ariz.

[73] Assignee: Microchip Technology Incorporated, Chandler, Ariz.

[21] Appl. No.: 09/251,374

[22] Filed: Feb. 17, 1999

[51] Int. Cl.[7] ................................................. G08B 13/14
[52] U.S. Cl. ...................................... 340/572.7; 340/572.8; 340/572.1; 340/573.4; 340/573.3; 343/718; 343/878; 343/867; 343/873; 455/100
[58] Field of Search ............................. 340/572.7, 572.8, 340/572.1, 573.3, 573.4, 573.1; 343/718, 878, 867, 873; 455/100

[56] References Cited

U.S. PATENT DOCUMENTS

| | | | |
|---|---|---|---|
| 5,075,670 | 12/1991 | Bower et al. | 340/573.4 |
| 5,504,474 | 4/1996 | Libman et al. | 340/573.4 |
| 5,512,879 | 4/1996 | Stokes | 340/573.4 |
| 5,627,520 | 5/1997 | Grubbs et al. | 340/572.1 |
| 5,745,037 | 4/1998 | Guthrie et al. | 340/573.4 |
| 5,793,290 | 8/1998 | Eagleson et al. | 340/573.4 |
| 5,883,576 | 3/1999 | De La Huerga | 340/573.1 |
| 5,973,600 | 10/1999 | Mosher, Jr. | 340/572.8 |
| 5,977,877 | 11/1999 | McCulloch et al. | 340/572.8 |

*Primary Examiner*—Benjamin C. Lee
*Attorney, Agent, or Firm*—Paul N. Katz; Ronald L. Chichester; Frohwitter

[57] ABSTRACT

A Radio Frequency Identification (RFID) security tag for attachment to a small article of merchandise to monitor the tagged item. The security tag uses a thin flexible strip. An RFID tag device is coupled to the thin flexible strip and is used for storing data related to the small article of merchandise to be monitored. A plurality of conductors are laid on the thin flexible strip. The plurality of conductors are coupled together to form a multiple turn coil for providing energy to the RFID tag device when a first end of the thin flexible strip is coupled to a second end of the thin flexible strip to form a loop.

18 Claims, 1 Drawing Sheet

6,043,746

RADIO FREQUENCY IDENTIFICATION (RFID) SECURITY TAG FOR MERCHANDISE AND METHOD THEREFOR

BACKGROUND OF THE INVENTION

1. Field of the Invention

This invention relates generally to a Radio Frequency Tag Device (RFID) tag device and, more specifically, to an RFID security device which is small enough to be placed on small items of merchandise and which will be enabled upon attachment and disabled if removed, disassembled or cut.

2. Description of the Prior Art

Various electronic security systems are available for monitoring merchandise and discouraging theft from retail establishments. Present systems generally consist of two dimensional Electronic Article Surveillance (EAS) tags which are coupled to an article of merchandise which is to be monitored. These types of systems have several drawbacks. In order to achieve sufficient read range for detection of stolen merchandise as it leaves the retailer, a two dimensional tag is rather large and unattractive. Normally, a two inch diameter tag is used in swept RF type systems and a one-half inch by two inch rectangle is used in acoustomagnetic systems. These large tags must hang from even the smallest pieces of merchandise such as jewelry.

Common EAS tags are attached to merchandise, such as jewelry, by a string or a plastic loop. The string or loop may be easily cut by a customer or employee rendering the EAS tag useless since exit monitors are used only to detect the presence of the EAS tag near a surveillance zone. Larger jewelry store chains lose upwards of ten million dollars per year in employee theft alone.

A further problem with current EAS tags is that they do not contain any intelligence that could be used for tracking inventory or sensing the presence of specific jewelry items. Present EAS tags are generally detected by radiating them with radio frequency energy when the tag enters a surveillance zone near an exit of the store, and detecting only that the tag is enabled or disabled.

Therefore, a need existed to provide an improved RFID security tag. The improved RFID security tag must be smaller and less bulky than current EAS tags. The improved RFID security tag must be able to be coupled to small articles of merchandise. The improved RFID security tag must be able to be coupled to small articles of merchandise such that the removal of the RFID security tag can immediately be detected. The improved RFID security must further be able to store information about the item tagged.

SUMMARY OF THE INVENTION

In accordance with one embodiment of the present invention, it is an object of this invention to provide an improved RFID security tag.

It is another object of the present invention to provide an improved RFID security tag that is smaller and less bulky than current EAS tags.

It is still another object of the present invention to provide an improved RFID security tag that is smaller and less bulky than current EAS tags and that may be coupled to small articles of merchandise in an unobtrusive manner.

It is still a further object of the present invention to provide an improved RFID security that is able to store information about the item tagged.

BRIEF DESCRIPTION OF THE PREFERRED EMBODIMENTS

In accordance with one embodiment of the present invention, a security tag for attachment to a small article of merchandise is disclosed. The security tag uses a thin flexible strip. A Radio Frequency Identification (RFID) tag device is coupled to the thin flexible strip and is used for storing data related to the small article of merchandise to be monitored. A plurality of conductors are laid on the thin flexible strip. The plurality of conductors are coupled together to form a multiple turn coil for providing energy to the RFID tag device when a first end of the thin flexible strip is coupled to a second end of the thin flexible strip to form a loop.

In accordance with another embodiment of the present invention, a method of providing a security tag for attachment to a small article of merchandise is disclosed. The method comprises the steps of: providing a thin flexible strip; providing a Radio Frequency Identification (RFID) tag device coupled to the thin flexible strip for storing data related to the small article of merchandise to be monitored; and providing a plurality of conductors laid on the thin flexible strip wherein the plurality of conductors are coupled together to form a multiple turn coil for providing energy to the RFID tag device when a first end of said thin flexible strip is coupled to a second end of said thin flexible strip to form a loop.

The foregoing and other objects, features, and advantages of the invention will be apparent from the following, more particular, description of the preferred embodiments of the invention, as illustrated in the accompanying drawing.

DETAILED DESCRIPTION OF THE PREFERRED EMBODIMENTS

Figure 1A:
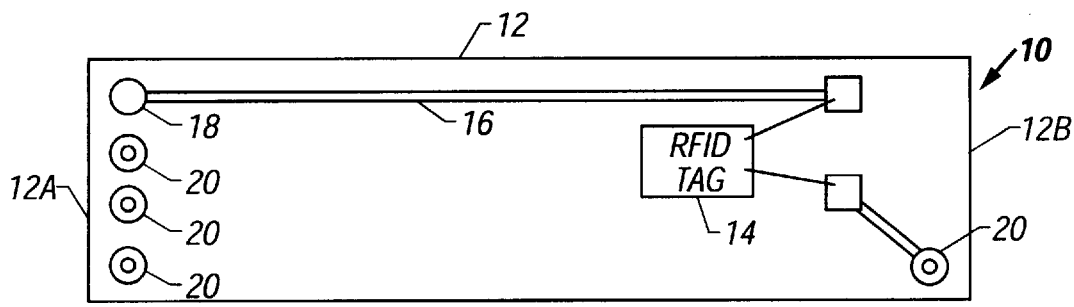
FIG. 1A shows a front view of a first embodiment of the present invention.
Figure 1B:
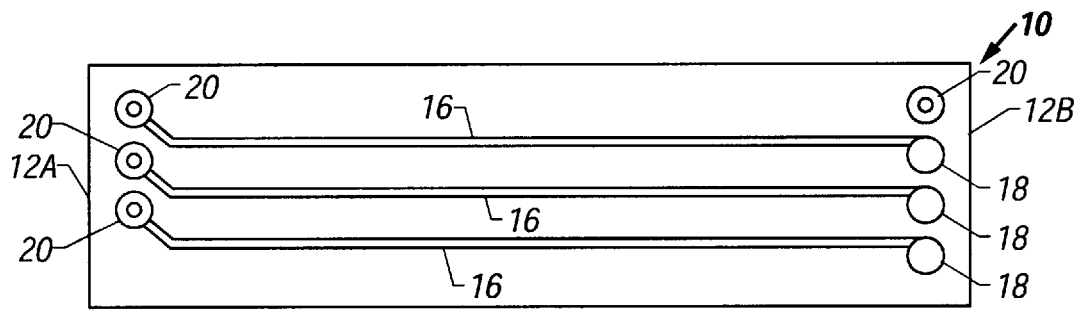
FIG. 1B shows a back view of the embodiment depicted in FIG. 1A.

Referring to FIGS. 1A–1B, one embodiment of a Radio Frequency Identification (RFID) security tag 10 for merchandise is shown. While the RFID security tag 10 may be used to monitor any type of merchandise, the RFID security tag 10 was designed to be unobtrusively attached through small items of merchandise like jewelry. The RFID security tag 10 will be enabled upon attachment to a specific piece of jewelry and disabled if removed, disassembled, or cut.

The RFID security tag 10 has a substrate 12. The substrate 12 is generally a thin flexible piece of material in which a conductor may be applied. Some examples of a substrate 12 are, but are not limited to: mylar, polyamide, polyester, paper, or any other type of thin flexible material. An RFID tag device 14 is coupled to the substrate 12. The RFID tag device 14 is used to store information related to the specific piece of merchandise which is tagged. This is important so that a reading mechanism in a display case, point-of-sale terminal, or doorway may detect the specific piece of merchandise being moved or if the RFID security tag 10 is being removed.

Figure 3:
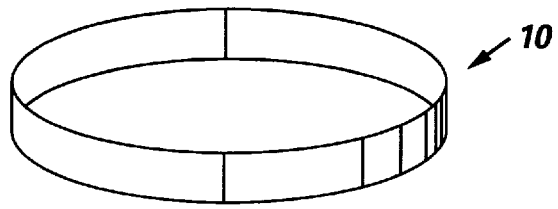
FIG. 3 shows an elevated perspective view of the present invention when the strip is formed into a loop and the ends are coupled together.

A plurality of conductors 16 are formed, etched, deposited or laid on the substrate 12. The conductors 16 are laid such that each conductor 16 does not come in contact with another conductor 16. The conductors 16 are generally laid in a parallel manner to one another along the length of the substrate 12. Each conductor 16 is directly coupled to a directly successive conductor 16 to form a single continuous conductor. When the substrate 12 is coupled together such that a first end 12A is coupled to a second end 12B to form a loop (see FIG. 3), the single continuous conductor now becomes a multiple turn coil which will energize the RFID tag device 14 when exposed to a radio frequency field. In a security application, the substrate 12 can be inserted through a ring, a piece of jewelry, or a piece or merchandise before the ends 12A and 12B are coupled together. Once the substrate 12 is cut or removed from the piece of merchandise, the RFID tag device 14 will stop modulating and an RFID reader located nearby can immediately detect that condition.

In the embodiment depicted in FIGS. 1A–1B, a first conductor and a last conductor are coupled to the RFID tag device 14. The first conductor and the last conductor are generally coupled to the RFID tag device 12 via wirebonding or flip-chip techniques which are well understood in the industry.

In the embodiment depicted in FIGS. 1A–1B, each of the plurality of conductors 16, except for the first conductor, has a surface connector 18 and a through connector 20. The first conductor has a first end coupled to the RFID tag device and a second end coupled to a surface connector 18. When the substrate 12 is coupled together through an item of merchandise such that a first end 12A is coupled to a second end 12 to form a loop (see FIG. 3), the surface connector 18 and through connector 20 allow the plurality of conductors 16 to be coupled together to form a single continuous conductor. The single continuous conductor is arranged to form a multiple turn coil which will energize the RFID tag device 14 upon exposure to an RF field. If the RFID security tag 10 is removed, disassembled, or cut, a reader located near the item of merchandise can immediately detect this condition and signal an alarm. The surface connector 18 and through connector 20 are coated with a conductive adhesive or other conductive material so that the circuit is completed when the ends 12A and 12B of tag 10 are coupled together. In the case of a conductive adhesive, the adhesive holds the ends 12A and 12B together. In the case of gold or other conductive material on connectors 18 and 20, a mechanical locking device such as a plastic snap can be molded into the substrate 12 for holding the connectors 18 and 20 in contact with each other.

Figure 2A:
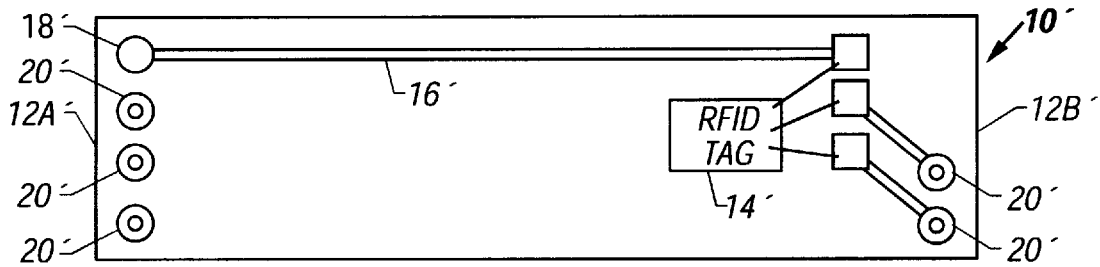
FIG. 2A shows a front view of another embodiment of the present invention.
Figure 2B:
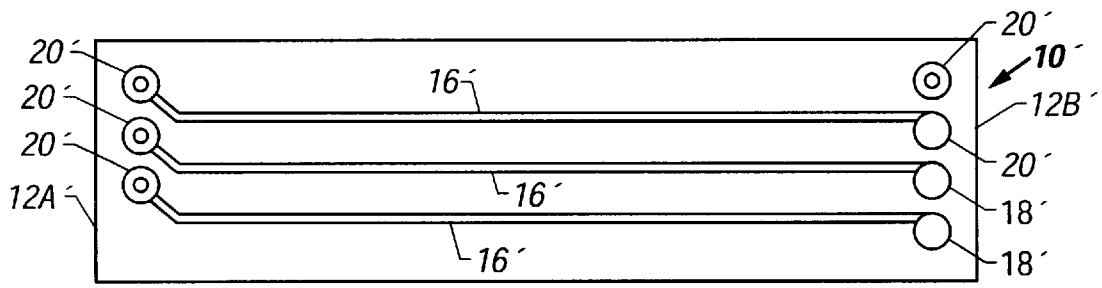
FIG. 2B shows a back view of the embodiment depicted in FIG. 2A.

Referring to FIGS. 2A–2B, wherein like numerals and symbols represent like elements with the exception of the use of "'" to indicate a different embodiment, another embodiment of the present invention is shown. The RFID security tag 10' is similar to that shown and described above. The only difference between the two embodiments is that the RFID security tag 10' has an additional bonding pad which allows three conductors 16' to be coupled to the RFID tag device 14'. This additional bonding pad is required for certain RFID tags 14' which have three connections to the resonance coil rather than the more common two connections.

The RFID security tags 10 and 10' are a more attractive and less bulky solution than current EAS tags. The RFID security tags 10 and 10' form a loop connecting through a piece of merchandise so that if the loop is removed or cut, the RFID security tag will stop modulating and an RF reader located near by can immediately detect this condition. The security tags 10 and 10', while smaller in two dimensions than current EAS tags, form an aperture (diameter) in three dimensions as large as current EAS tags, which is necessary for adequate read range. For example, one embodiment may use a ⅛" wide substrate, 6" long to form a 2" diameter loop antenna when the ends of the substrate are coupled together. Those skilled in the art will recognize that the antenna aperture (diameter) is related to the energy coupling the reader to the tag thereby affecting read range. The RFID security tags 10 and 10' will further store information related to the specific piece of merchandise tagged. This is important so that a reader in a display case, point-of-sale terminal, or doorway can detect the specific RFID security tag 10 or 10' being moved, purchased or cut.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A security tag for attachment to a small article of merchandise comprising, in combination:
   a thin flexible strip;
   a Radio Frequency Identification (RFID) tag device coupled to said thin flexible strip for storing data related to said small article of merchandise; and
   a plurality of conductors laid on said thin flexible strip wherein said plurality of conductors are coupled together to form a multiple turn coil for providing energy to said RFID tag device when a first end of said thin flexible strip is coupled to a second end of said thin flexible strip to form a loop.

2. A security tag for attachment to a small article of merchandise in accordance with claim 1 wherein each of said plurality of conductors are laid parallel to one another on said thin flexible strip.

3. A security tag for attachment to a small article of merchandise in accordance with claim 2 wherein a first of said plurality of conductors and a last of said plurality of conductors are coupled to said RFID tag device.

4. A security tag for attachment to a small article of merchandise in accordance with claim 2 wherein at least three of said plurality of conductors are coupled to said RFID tag device.

5. A security tag for attachment to a small article of merchandise in accordance with claim 3 wherein each of said plurality of conductors is coupled to a directly succeeding conductor and said last conductor is directly coupled to said first conductor to form a single continuous conductor.

6. A security tag for attachment to a small article of merchandise in accordance with claim 5 wherein said single continuous conductor forms a multiple turn coil when said first end of said thin flexible strip is coupled to said second end of said thin flexible strip to form a loop.

7. A security tag for attachment to a small article of merchandise in accordance with claim 6 wherein said single continuous conductor forms a make/break connection with said RFID tag device to energize said RFID tag device.

8. A security tag for attachment to a small article of merchandise in accordance with claim 5 wherein each of said plurality of conductors has at least one connector for coupling each of said plurality of conductors to a directly succeeding conductor and for coupling said last conductor to said first conductor.

9. A security tag for attachment to a small article of merchandise in accordance with claim 8 wherein one of said connectors is a conductive adhesive for coupling said first end of said thin flexible strip to said second end of said thin flexible strip to form said loop.

10. A method of providing a security tag for attachment to a small article of merchandise comprising the steps of:

providing a thin flexible strip;

providing a Radio Frequency Identification (RFID) tag device coupled to said thin flexible strip for storing data related to said small article of merchandise; and providing a plurality of conductors laid on said thin flexible strip wherein said plurality of conductors are coupled together to form a multiple turn coil for providing energy to said RFID tag device when a first end of said thin flexible strip is coupled to a second end of said thin flexible strip to form a loop.

11. The method of claim 10 wherein said step of providing a plurality of conductors further comprises the step of laying each of said plurality of conductors parallel to one another on said thin flexible strip.

12. The method of claim 11 further comprising the step of coupling a first of said plurality of conductors and a last of said plurality of conductors to said RFID tag device.

13. The method of claim 11 further comprising the step of coupling at least three of said plurality of conductors to said RFID tag device.

14. The method of claim 12 further comprising the steps of:

coupling each of said plurality of conductors to a directly succeeding conductor; and coupling said last conductor directly to said first conductor to form a single continuous conductor.

15. The method of claim 14 wherein said single continuous conductor forms a multiple turn coil when said first end of said thin flexible strip is coupled to said second end of said thin flexible strip to form a loop.

16. The method of claim 15 wherein said single continuous conductor forms a make/break connection with said RFID tag device to energize said RFID tag device.

17. The method of claim 14 further comprising the step of providing at least one connector for each of said plurality of conductors for coupling each of said plurality of conductors to a directly succeeding conductor and for coupling said last conductor to said first conductor.

18. The method of claim 17 wherein said step of providing at least one connector for each of said plurality of conductors further comprises the step of providing a conductive adhesive as at least one of said connectors for each of said plurality of conductors for coupling said first end of said thin flexible strip to said second end of said thin flexible strip to form said loop.

* * * * *